March 30, 1965 — B. TARLOW — 3,175,597
AUTOMOBILE TIRE CHAIN DEVICE
Filed Oct. 14, 1963 — 2 Sheets-Sheet 1

INVENTOR.
Benjamin Tarlow
BY
Thomas, Weisman & Russell
ATTORNEYS

March 30, 1965 B. TARLOW 3,175,597
AUTOMOBILE TIRE CHAIN DEVICE
Filed Oct. 14, 1963 2 Sheets-Sheet 2
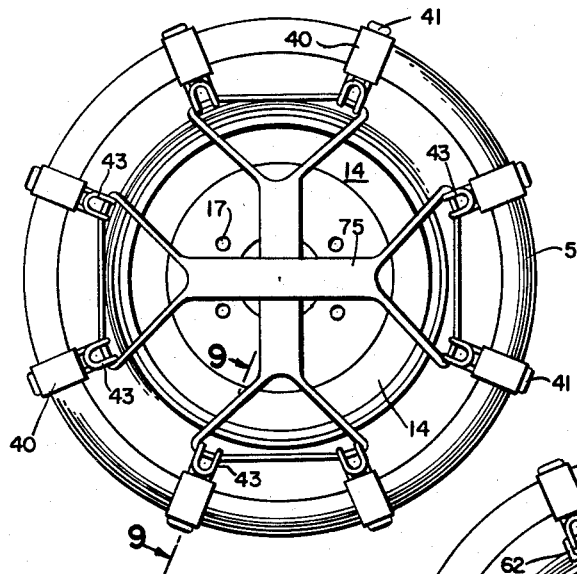
FIG.7.
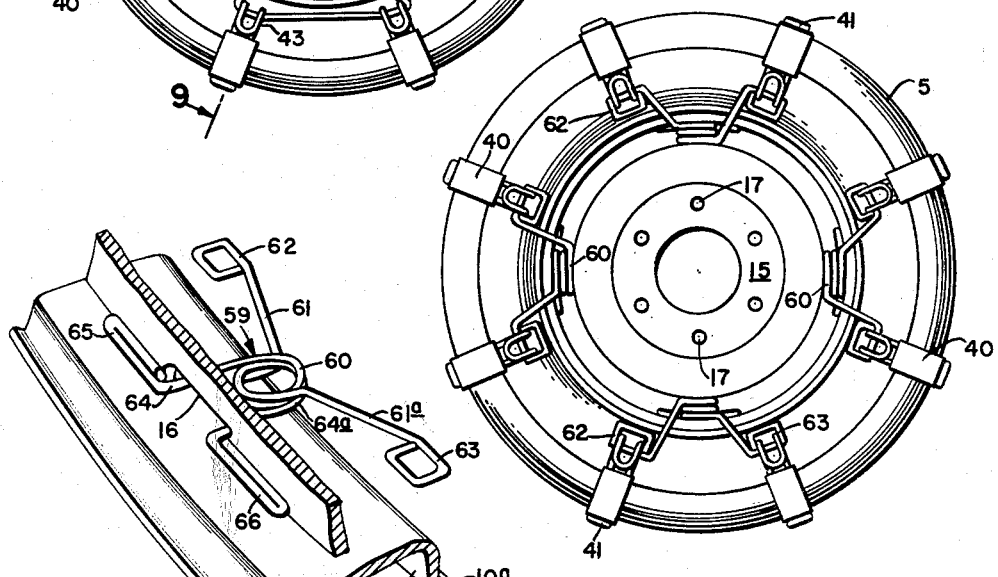
FIG.10.
FIG.8.
FIG.9.
INVENTOR
Benjamin Tarlow
BY Thomas, Weisman & Russell
ATTORNEYS

3,175,597
AUTOMOBILE TIRE CHAIN DEVICE
Benjamin Tarlow, 3809 Glen Ave., Baltimore, Md.
Filed Oct. 14, 1963, Ser. No. 316,796
3 Claims. (Cl. 152—237)

This application is a continuation-in-part of application Serial No. 247,973, filed December 28, 1962, and now abandoned.

The instant invention relates to an improvement in anti-skid devices of the type designed for affixation to the periphery of the usual automobile tire. In more particular, this invention is directed to a tire chain assembly particularly adapted for use on the modern type of automobile. Present day automobile wheels are generally not of the spoked variety, as the latter term is generally understood. More usually, and in nearly 100% of all models and makes of automobiles, the wheel generally consists of the usual rim and intermediate hub or hub plate. The latter is not continuous around the rim but rather, there are usually three or four elongated peripheral slots in the hub plate intermediate the periphery of the latter and the rim. In the instant case the invention is designed for use with this type of rim, these slots providing means for a most simplified interconnection with suitable chain straps, representing the anti-skid elements themselves, which embrace the periphery of the tire.

It is of course recognized that in the past a multitude of devices have been proposed to supplant the ordinary type of tire chain, mainly because those commonly used today are difficult to install, require jacking up of the rear tires and time-consuming hand manipulation to seat these types of chains in proper fashion about the periphery of the tire.

However, past devices have not appeared to be readily marketable, usually for such reasons as the relative complexity of same and resultant expense of manufacture with consequent reluctance on the part of the consumer to meet the usually excessive price of same. Also, many past devices designed for this purpose, if they be of the nature to be easily installed, require some functional change made to the supporting rim, such as an additional bracket welded to the rim, appropriate aperture bored at spaced intervals in the rim, etc.

The instant invention takes advantage of the described nature of the automobile wheel as it is generally now being manufactured: the spaced slots adjacent to the rim of the wheel afford an ideal solution to the proper placement and ease of installation of a skid device, and this without alteration of the rim, hub plate or addition to such elements of a plurality of holding devices that are not ordinarily standard equipment upon the ordinary type of passenger automobile.

It is accordingly a primary object of the instant invention to provide an automobile tire chain device which eliminates the necessity of jacking up of the involved wheel, similarly eliminates the necessity of alteration to the rim or attachment thereto of additional holding or supporting devices, and which, consistent with these advantages, still represents the essence of simplicity and therefore, a device conducive to moderate fabrication cost.

It is a further object of the invention to provide a device of the nature briefly outlined above which achieves the enumerated functions, inter alia, by providing a unique form of clip means which extends through the referred to rim plate slots and which is easily placed in the proper position without elevation of the wheel and except for installation at the ground contacting point, without rotation of the wheel.

It is a further objective of the invention, in one embodiment thereof, to provide such an easily installed clip holding means in conjunction with a locking member which permits locking of the assembly after installation, to eliminate the possibility of theft thereof.

Another functional advantage of the invention is that it is adapted for use upon the usual type of automobile or truck wheel irrespective of the shape of the rim and without alteration in any respect to the rim, hub or other basic components of the wheel. Also it will be observed that the units of the instant device may be installed in double units, it making no difference how many hub slots there be in the involved rim.

The invention will be described in more detail in conjunction with the accompanying drawings thereof wherein:

FIGURE 7 is a view similar to FIGURE 1 but illustrating, from the outside of the wheel, an alternate embodiment of the invention;

FIGURE 8 is a view of such alternate version of the invention, as shown in FIGURE 7, but viewing the same from the reverse side to that shown in FIGURE 7 or from the inside of the wheel;

FIGURE 9 is a section view taken on the line 9—9 of FIGURE 7; and

FIGURE 10 is an enlarged perspective view, similar to FIGURE 4, but illustrating a different embodiment of the rim engaging clip means, and as such is oriented together with other elements of the invention in FIGURES 7 to 9 inclusive.

Figure 1:
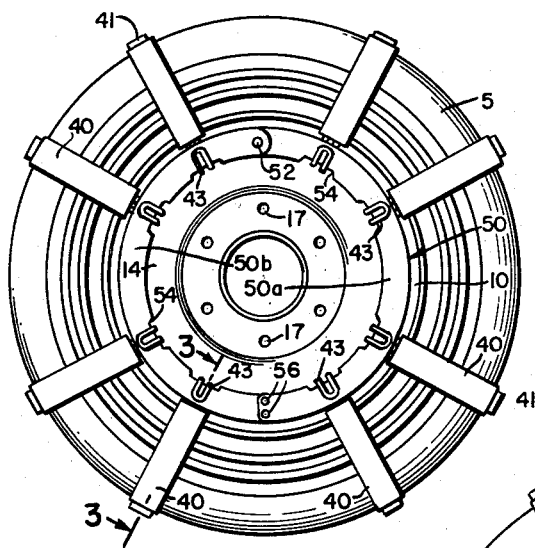
FIGURE 1 is a side elevation view of one embodiment of the invention from the outside thereof, as the same is installed upon the usual type of automobile wheel, the wheel here depicted having the more usual number of four "spokes" or slots about the hub periphery.

Referring more specifically to these figures, it is seen that the usual type of pneumatic tire 5 is shown as being positioned upon a common form of rim 10, the latter being provided with outwardly turned flanges 10a and 10b as such are more clearly indicated in FIGURES 3, 4, 9 and 10, and which are common in the manufacture of the usual automobile wheel. As is generally the case, the rim 10 is supported by a hub plate 14 which in turn near its center portion is affixed to or made unitary with a hub 15, the latter being suitably apertured (as indicated at 17) for the reception of lug bolts for affixation in the usual manner to the drive axle.

As has been noted above, the popular type of automobile rim is not spoked, but rather, what is here termed to be the hub plate, 14, extends throughout substantially the entire area enclosed by the rim, the only exception being a series of elongated apertures or slots 16 which are formed in the hub plate and are positioned in between same and the rim proper 10, thus forming what might be loosely termed the "spokes" of the wheel. The number of such slots 16 may vary in number, depending upon the particular model and make of automobile, but this makes no difference in the application of the instant device. More generally there are four such slots 16 as shown in these figures. However, insofar as the instant invention be concerned, and as indicated, it makes no difference for the attachment is readily adaptable to a rim having two or more such openings or slots 16, and any number of pairs of chain straps can be utilized, as desired by the operator.

Figure 5:
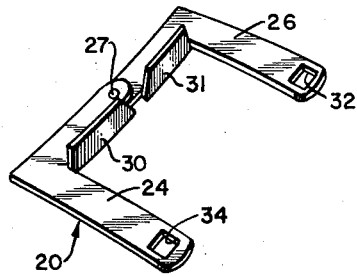
FIGURE 5 is an enlarged perspective view of the specific interlock means employed in this version of the invention.
Figure 4:
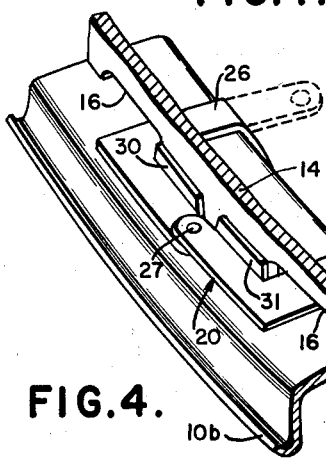
FIGURE 4 is a perspective view of the rim interlock means, somewhat enlarged to illustrate the details thereof.
Figure 2:
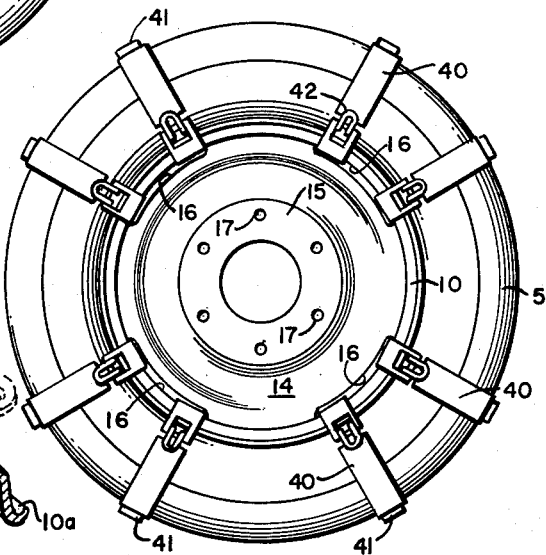
FIGURE 2 is an elevation view, similar to FIGURE 1, and depicting the reverse side of the elements of the assembly as they are shown in FIGURE 1.
Figure 3:
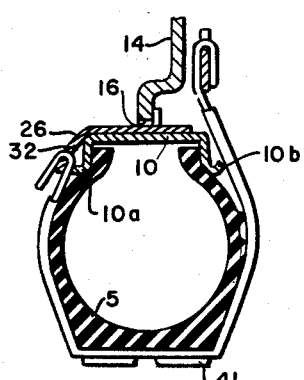
FIGURE 3 is a section view taken on the line 3—3 of FIGURE 1.

In one embodiment of the invention an easily inserted clip means or bracket for supporting the encircling tire chain elements takes the form of that particularly shown in FIGURE 5, its manner of attachment being indicated in FIGURES 1 to 4. Here such clip means comprises two right-angular pieces 24 and 26 which are joined at their inner and facing ends by a pivot 27 enabling relative motion to some degree of each with respect to the other, and thus permitting adjustment to suit differently sized or differently spaced wheel slots. At the opposite end, each of these right-angular and pivoted elements contains a rectangular opening or aperture, as shown at 32 and 34, for engagement with the anti-skid chain elements, as will be described. Near the pivot point 27 each of these right-angular elements 24 and 26 are provided with integral and upright flanges 30 and 31 which perform the function of providing further support of such clips, as these flanges bear directly against the outside face of the rim plate 14, as shown in FIGURE 4.

These fasteners or clip elements 20 may be fabricated of any suitable metal and preferably one which is sufficiently resilient or flexible to permit the temporary bending down of the terminal portions thereof bearing the apertures 32 and 34, much in the manner as the same are bent down to approximate the curvature of the tire 5. This will be understood by reference to FIGURE 4 where the terminal ends of the clip means 20 are indicated in their normally flat position, in dotted line, with their inward position indicated in solid line, the latter being the result of strain or tension placed upon such clips by interconnection with the several anti-skid devices. Alternatively the elements 20 may be made of leather or other resilient material sufficiently strong to accomplish the functions of the invention herein described.

At any rate, particularly from the showing of the invention found in FIGURE 4, it will be seen that these clips or fasteners 20 are readily installed; each of the arms 24 and 26 is extended through an adjacent one of the slots 16 with the upstanding flanges 30 and 31 bearing against the surface of the hub plate. It will also be seen, as positioned in FIGURE 4, that the operator inserts these clips 20 from outside through the desired and adjacent slots 16 to the inner side of the rim.

Once these clips have been thusly positioned a pair of strap means or ground engaging non-skid devices are readily attached to the respective and inwardly extending members 24 and 26 by clipping the same through the apertures 32 and 34.

Figure 6:
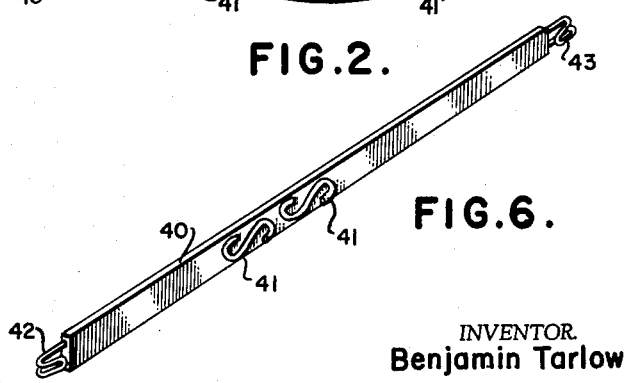
FIGURE 6 illustrates a typical strap arrangement which supports the ground engaging links and which is suitable for mounting upon the rim interlock device as the same is shown in FIGURES 1 to 5 inclusive.

Such a strap means is indicated at 40, FIGURE 6. This may be made of leather, synthetic rubber or other materials obviously suited for such purpose.

The strap 40 provides the supporting means for the ground engaging and anti-skid elements themselves, here shown at 41. In this representation of the invention such merely takes the form of two or more S-shaped members which are bonded or otherwise affixed to the surfaces of the flexible strap by any well known method. It will be noted that these ground engaging links 41 are nearer one end of the strap 40 than the other. In this instance they are shown nearer the end link or hook element 42. This is because the longer side of the strap means 40 must encircle more of the tire than the shorter side in order to reach the ring engaging means, to be described; whereas the shorter side of the strap 40, adapted to engage the clip means 20 need not extend so far inwardly. In any event, each end of the ground engaging straps 40 is provided with a clip, such as the referred to hook element 42, and an opposed clip or hook element 43. These hooks are affixed to the respective ends of the strap 40 in any suitable fashion. Thus, as to each one of the pairs of straps 40, the same are designed for connection to one of the openings 32 or 34 by the clip means 20 with the other end of the strap 40 being brought around the periphery of the tire to be maintained in position by an additional holding device to be now described.

The latter consists of a circular element 50 comprised of two semicircular members 50a and 50b (FIGURE 1). It is adapted to for positioning upon the outside of the wheel, or more particularly, the hub plate. Once one end of the strap 40 has been secured in an appropriate opening, such as 32 or 34 of the clip means 20, and brought around the tire to a position on the opposite side thereof, the other end of the member 40 is now in position to engage the ring 50, being preferably positioned in a slot 54 formed in the ring 50 for this purpose.

This securing ring on the front or outwardly facing side of the wheel hub is comprised of the two halves 50a and 50b respectively. The latter are pivoted together by a pivot 52.

When all of the straps have been positioned in the manner set forth in the foregoing, the ring 50 is positioned as shown in FIGURE 1 the two halves being drawn together to form a complete circular enclosure. Directly opposite the pivot 52 is provided a means for locking these two halves together in this position. This locking means comprises, in this example of the invention, suitable apertures 56 in each adjacent end of the ring elements 50. These apertures accommodate appropriate locking pins, such as cotter pins, whereby the two halves forming the ring 50 are maintained in the position shown.

Alternatively the spaced openings or apertures 56 form an ideal means for the locking of the entire assembly in this operative position. Such two openings 56 in each half, when located in alignment with the complementary openings 56 in the other half, enable the insertion of a padlock means therethrough so that the entire assembly may then be secured in the fashion indicated, and removal or theft therefrom prevented.

An alternate embodiment of the invention is shown in FIGURES 7 to 9 inclusive, wherein common and like parts are designated by like numerals. Here it is seen that a different clip means is used, i.e., with reference to the support for those ends of the chain strap 40 which encircle the tire and are affixed upon the inside of the rim.

With particular reference to FIGURE 10, it is seen that in this alternate version of the invention the spring clip generally indicated at 59 is utilized; an helical spring 60 terminates on one side thereof in parallel arms 61 and 61a. The latter are bent upon themselves, as at 62 and 63, to create two adjacent openings. These openings perform the same function as openings 32 and 34 heretofore described with respect to the clip elements 20, i.e., they are designed to receive the clips 42 provided at one end of the strap elements 40.

It will be observed that although the function of the elements 20 and spring clips 59 in the two embodiments of the invention herein described are the same, they are somewhat differently mounted in the hub plate of a given wheel. In this respect and referring to clip means 20, the two opposed arms 24 and 26 are each inserted in adjacent but different slots 16. On the other hand, the spring clips 59 are adapted to be separately inserted through a single slot 16, as is particularly illustrated in FIGURE 10. In either construction the result is functionally the same: on the one hand the arms 24 and 26 provide two adjacent points for engagement with the hook elements 42 of a pair of adjacent tire straps; in the case of the spring clip 59 the latter is similarly provided with the spaced hook engaging means 62–63 for attachment to the chain straps.

The helical spring means 60, at the side opposite the described formations 62 and 63 also has provided, as an integral part thereof, two parallel arms 64 and 64a which extend through opening 16. At their terminal ends these arms 64–64a are bent at right angles (in opposite directions) and then bent upon themselves as clearly shown in FIGURE 10. Thus these right-angular arms or extensions 65, 66 perform the same holding function as the members 30, 31 on each side of the pivot 27 of the clip element 20 and as heretofore described with respect to FIGURES 1 to 6 inclusive; i.e., elements 65 and 66 bear firmly against the outer side of the hub plate 14 when tension is placed upon the opposite ends thereof.

Thus the spring means 60 and the just described component parts thereof enable insertion of such retaining member through the slots 16 merely by compression of the two loops 62, 63 toward each other. The spring element is so biased that after being compressed to this extent these latter elements spring apart and the clip is retained in this open position shown in FIGURE 10 with the right-angular arms or stop members 65, 66 bearing against the outer side of hub plate 14.

The function or operation of this type of clip element should be readily apparent from the foregoing description: such clips are inserted in each of the slots 16 of a given hub plate such as that shown at 14 in FIGURE 10. Then the hook members 42 are inserted in each of the openings provided by loops 62 and 63, as shown in FIGURE 8 and passed over the periphery of the tire to the front side. Here the hook members 43 at the opposite end of the strap 40 are in position for retention in the manner shown in FIGURE 7.

In this instance the chain straps 40 are retained in this position by use of tensioning means 75 of the preferred embodiment as in the configuration shown in FIGURE 7. This tensioning means comprises a flexible strap with holes therein at either end adapted to engage clips 43. In the instant case, these resilient tension elements 75, of rubber or other elasticized material, are simply slipped over a hook member 43 to other hook members on the opposite side of the tire, and, tending to exert radial stress upon same in the direction of the hub, maintain the entire arrangement in the relative position shown in FIGURES 7 and 8.

It is to be observed that each type of clip element, either that of FIGURE 5 or FIGURE 10, is designed to support at least two chain straps. All of the chain straps indicated in the accompanying drawings need not be employed; obviously only two pairs may be desirable under certain road conditions. Alternatively, the four pairs with an accompanying pair of criss-cross tension elements can be installed as shown with consequent better spacing of each of the chain straps with respect to the others.

It is also considered that the invention must be applicable to different diameter wheels as well as different sized tires. In this respect the chain straps 40 may be fabricated of any rubber-like material having sufficient elasticity to permit its extension or stretching to the desired point to compensate for such different sizes. On the other hand, if the chain straps 40 are fabricated of leather or some like material having little or no elasticity, then such straps can be optionally fabricated of different lengths so that certain lengths thereof will accommodate certain sized wheels and tires. This of course is usual with respect to the fitting of most tire chains that are in common use today; such chains are made of different sizes and the car owner must designate the tire and wheel size before purchase in order to assure proper fitting thereof. Manifestly also, the chain straps may be fabricated with suitable adjustment devices intermediate their lengths to permit adjustment to the desired length for a given tire size.

From the foregoing, it is to be appreciated that the two alternate embodiments of the invention propound an exceedingly simple solution to a most troublesome problem—an inexpensive arrangement permitting ease of attachment and detachment of an alternate number of chain elements to an automobile tire without the necessity of extraneous holding devices which must be welded to or otherwise affixed to the wheel rim, or the wheel itself. The anti-skid straps of this invention can be placed upon the automobile wheel around the entire periphery thereof except that portion in contact with the ground. And if it be desired to install one of the chain units at such ground contacting point, the car is merely moved forwardly or rearwardly a sufficient distance to permit passage of the strap member 40 around the tire; in any event jacking up of the tire is eliminated, due to the ease of manipulation of the described clip elements, which are simply attached by placement through the desired slot or slots 16, hooked to the chain straps on the inside, and the so engaged chain straps placed under tension on the outside of the wheel by either the circular locking piece 50 or tension element 75.

Although other obvious expedients and alternates may be employed to accomplish the purpose of this invention, it is intended that the scope thereof be limited only as set forth in the following claims.

I claim:

1. An anti-skid device for attachment to the tire of an automobile wheel, said wheel having a plurality of slots near the periphery of the hub plate thereof, said device comprising at least two pairs of tire straps, a tension means therefor, and a clip means adapted for insertion through at least one of said slots, said clip means comprising a spring element having two hook engaging means thereon at one side thereof, the opposite side thereof having hub plate contacting flanges thereon, whereby upon compressing said two hook engaging means together said last named means may be passed through one of said slots for engagement with said tire straps, each one of said pairs of tire straps having first hook means at one end thereof for engagement with said hook engaging means, each of said straps having ground engaging lugs thereon, a second hook means on the other end of each one of said pairs of tire straps, and tension means on the outside of said wheel to engage one pair of said second hook means with another pair of said second hook means whereby to pull said tire straps taut against the periphery of said tire, said tension means comprising a flexible strap element adapted to be positioned through each of said second hook means and exert radial tension thereon in a direction toward the center of said hub plate.

2. An anti-skid device for attachment to the tire of an automobile wheel, said wheel having a plurality of slots near the periphery of the hub plate thereof, said device comprising at least two pairs of tire straps, tensioning means therefor, and a hub clip means comprising a spring element having two hook-engaging means thereon at one side thereof, the opposite side thereof having hub plate contacting flange means thereon adapted to seat against the outside of said hub plate, whereby, upon compressing said two hook-engaging means together, said contacting flange means may be passed through one of said slots for engagement as aforesaid with the hub plate, each one of said pairs of tire straps having first hook means at one end thereof for engagement with one of said respective hook-engaging means, each of said straps having ground-engaging lugs thereon, a second hook means on the other end of each one of said pairs of tire straps, and tensioning means on the outside of said wheel to engage one pair of said second hook means with another pair of said second pair of hook means to pull said tire straps taut against the periphery of said tire.

3. In an anti-skid device for attachment to the tire of an automobile wheel, said wheel having a plurality of slots near the periphery of the hub plate thereof, said device comprising at least two pairs of tire straps, tensioning means therefor, and a clip means adapted for insertion to at least one of said slots, one pair of each of said clip means having traverse hub plate engaging means adapted to seat against the outer side of said hub plate, the other end of said clip means being adapted to extend through one of said slots to the inner side of said hub plate, said other end having two slot means thereon, each one of said pairs of tire straps having first hook means at one end thereof for engagement with one of said respective two slot means, each of said straps having ground-engaging lugs thereon, a second hook means on the other end of each one of said pairs of tire straps, and tensioning means on the outside of said wheel comprising a flexible strap having holes therein at either end adapted to engage a pair of said second hook means at each of its respective ends to pull said tire straps taut against the periphery of said tire.

References Cited by the Examiner

UNITED STATES PATENTS

| | | | |
|---|---|---|---|
| 2,204,783 | 6/40 | Wettlaufer | 152—231 |
| 3,032,090 | 5/62 | Robinson | 152—237 |

ARTHUR L. LA POINT, *Primary Examiner.*